United States Patent
Pillay et al.

(10) Patent No.: US 11,893,362 B2
(45) Date of Patent: *Feb. 6, 2024

(54) MOBILE APPLICATION DEVELOPMENT DEVICE

(71) Applicant: Bank of America Corporation, Charlotte, NC (US)

(72) Inventors: Sanjay Pillay, Round Rock, TX (US); Anton Sumin, New York, NY (US); Piedad L. Burnside, Hicksville, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,969

(22) Filed: Feb. 21, 2023

(65) Prior Publication Data

US 2023/0205493 A1 Jun. 29, 2023

Related U.S. Application Data

(63) Continuation of application No. 17/839,067, filed on Jun. 13, 2022, now Pat. No. 11,635,945, which is a continuation of application No. 17/398,758, filed on Aug. 10, 2021, now Pat. No. 11,403,072.

(51) Int. Cl.
  *G06F 8/30* (2018.01)
  *G06F 8/38* (2018.01)

(52) U.S. Cl.
  CPC .............. *G06F 8/314* (2013.01); *G06F 8/37* (2013.01); *G06F 8/38* (2013.01)

(58) Field of Classification Search
  None
  See application file for complete search history.

(56) References Cited

U.S. PATENT DOCUMENTS

| | | | |
|---|---|---|---|
| 8,554,732 B2 * | 10/2013 | Clark | G06F 8/71 717/121 |
| 8,612,933 B1 * | 12/2013 | Gill | G06F 8/30 717/110 |
| 8,744,359 B2 | 6/2014 | Ramsten et al. | |
| 8,813,028 B2 | 8/2014 | Farooqi | |
| 8,875,095 B2 | 10/2014 | Hirsch et al. | |
| 8,898,630 B2 | 11/2014 | Hirsch et al. | |
| 8,978,006 B2 | 3/2015 | Hirsch et al. | |
| 9,037,906 B2 | 5/2015 | Kim et al. | |
| 9,038,015 B1 | 5/2015 | Allsbrook | |
| 9,100,541 B2 | 8/2015 | Kim et al. | |

(Continued)

OTHER PUBLICATIONS

Ahmad et al., An Empirical Study of Investigation Mbile Applications Development Challenges; IEEE, 2018, 18pg.

(Continued)

*Primary Examiner* — Philip Wang
(74) *Attorney, Agent, or Firm* — Banner & Witcoff, Ltd.

(57) ABSTRACT

A mobile application development device having a platform processor, a native application converter engine, and a mobile platform framework engine configured to facilitate the development and deployment of mobile applications configured to be run on different mobile operating systems from code that is developed independently and agnostic of the mobile operating system on which it will ultimately run.

20 Claims, 6 Drawing Sheets

(56) References Cited

U.S. PATENT DOCUMENTS

| | | | |
|---|---|---|---|
| 9,131,336 B2 | 9/2015 | Zinn et al. | |
| 9,134,964 B2* | 9/2015 | Hirsch | G06F 8/30 |
| 9,146,732 B2* | 9/2015 | Aiglstorfer | G06F 8/65 |
| 9,226,133 B1 | 12/2015 | Spanel et al. | |
| 9,280,483 B1 | 3/2016 | Ghoshal et al. | |
| 9,287,937 B2 | 3/2016 | Oba et al. | |
| 9,319,155 B2 | 4/2016 | Rao et al. | |
| 9,357,378 B1 | 5/2016 | Delker et al. | |
| 9,590,862 B2 | 3/2017 | Larocca | |
| 10,136,243 B2* | 11/2018 | Shen | H04W 4/60 |
| 10,146,803 B2 | 12/2018 | Kilby et al. | |
| 10,198,522 B1 | 2/2019 | Boyle et al. | |
| 10,884,732 B1* | 1/2021 | Zolotow | G06F 8/76 |
| 10,893,048 B2 | 1/2021 | Qiu | |
| 11,307,830 B2 | 4/2022 | Bodin et al. | |
| 11,323,273 B2* | 5/2022 | Ramgopal | G06F 8/38 |
| 2004/0158820 A1* | 8/2004 | Moore | G06F 8/51 717/136 |
| 2012/0260232 A1* | 10/2012 | Hirsch | G06F 8/30 717/107 |
| 2013/0047150 A1* | 2/2013 | Malasky | G06F 9/44547 717/176 |
| 2013/0205276 A1 | 8/2013 | Hirsch et al. | |
| 2014/0059521 A1* | 2/2014 | Voliter | G06F 9/45516 717/125 |
| 2017/0006135 A1* | 1/2017 | Siebel | H04L 67/53 |
| 2017/0192987 A1 | 7/2017 | Desineni et al. | |
| 2018/0300298 A1 | 10/2018 | Warila et al. | |
| 2019/0384616 A1 | 12/2019 | Govindaraj | |
| 2019/0391795 A1* | 12/2019 | Nikko | G06F 8/4442 |
| 2020/0012592 A1 | 1/2020 | Poulin | |
| 2021/0141713 A1* | 5/2021 | Poulin | G06F 30/33 |

OTHER PUBLICATIONS

Fentaw, Awel Eshetu, Cross platform mobile application development: a comparison study of React Native Vs Flutter, University of JyväskylÄ, 2020, 98pg.

Gonsalves, Michael, Evaluating the Mobile Development Frameworks Apache Cordova and Flutter and Their Impact on the Development Process and Application Characteristics, CalState, 2018, 90pg.

Ottka, Sanna; Comparison of mobile application development tools for multi-platform industrial applications; Aalto University; 2015, 75pg.

* cited by examiner

US 11,893,362 B2

MOBILE APPLICATION DEVELOPMENT DEVICE

This application claims the benefit of and is a continuation of U.S. patent application Ser. No. 17/839,067, filed Jun. 13, 2022 and entitled "Mobile Application Development Device," which is continuation of U.S. patent application Ser. No. 17/398,758, filed Aug. 10, 2021, and entitled "Mobile Application Development Device," both of which are incorporated by reference herein in their entireties,

TECHNICAL FIELD

Aspects of this disclosure generally relate to processes and devices utilized in mobile application development. This disclosure includes a device that can be used to allow application development to be agnostic to the type of mobile operating system on which the application functionality will ultimately be implemented.

BACKGROUND

Mobile application development within an organization may involve implementing a project as multiple different versions of an application tailored to different mobile operating systems, and tailored to different types of users (internal users within an organization, and public users external to an organization, among others). This development methodology may introduce inefficiencies associated with recreating functions for each application type. No device exists that addresses these development inefficiencies that can be used to streamline mobile application development.

BRIEF SUMMARY

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

In one aspect, this disclosure includes a mobile application development device that includes a platform processor. The platform processor may be configured to identify an application build element of an application in development, identify and classify an application logic block portion of the application build element written in a platform-agnostic language, and identify a platform on which application is to be executed. The platform processor may further be configured to apply a platform-native template to the application logic block that is specific to the platform on which application is to be executed. The mobile application development device may further include a native application converter engine that is configured to identify logic features that are specific to the application to be built, and to extract the logic features as a first set of tags associated with the application to be built. The native application converter engine may also be configured to identify a second set of tags within the template applied by the platform processor, such that the second set of tags matches the first set of tags. The native application converter engine may further be configured to replace the second set of tags with elements that are specific to the application to be built, and output a converted intermediary codebase. The mobile application development device may also include a mobile platform framework engine that is configured to add a common set of application features to the converted intermediary codebase, such that subsequent to the addition of the common set of application features, the converted intermediary codebase is compiled and outputted as the application.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. It is noted that these connections are general and, unless otherwise specified, may be direct or indirect, wired or wireless, and that the specification is not intended to be limiting in this respect.

Figure 1:
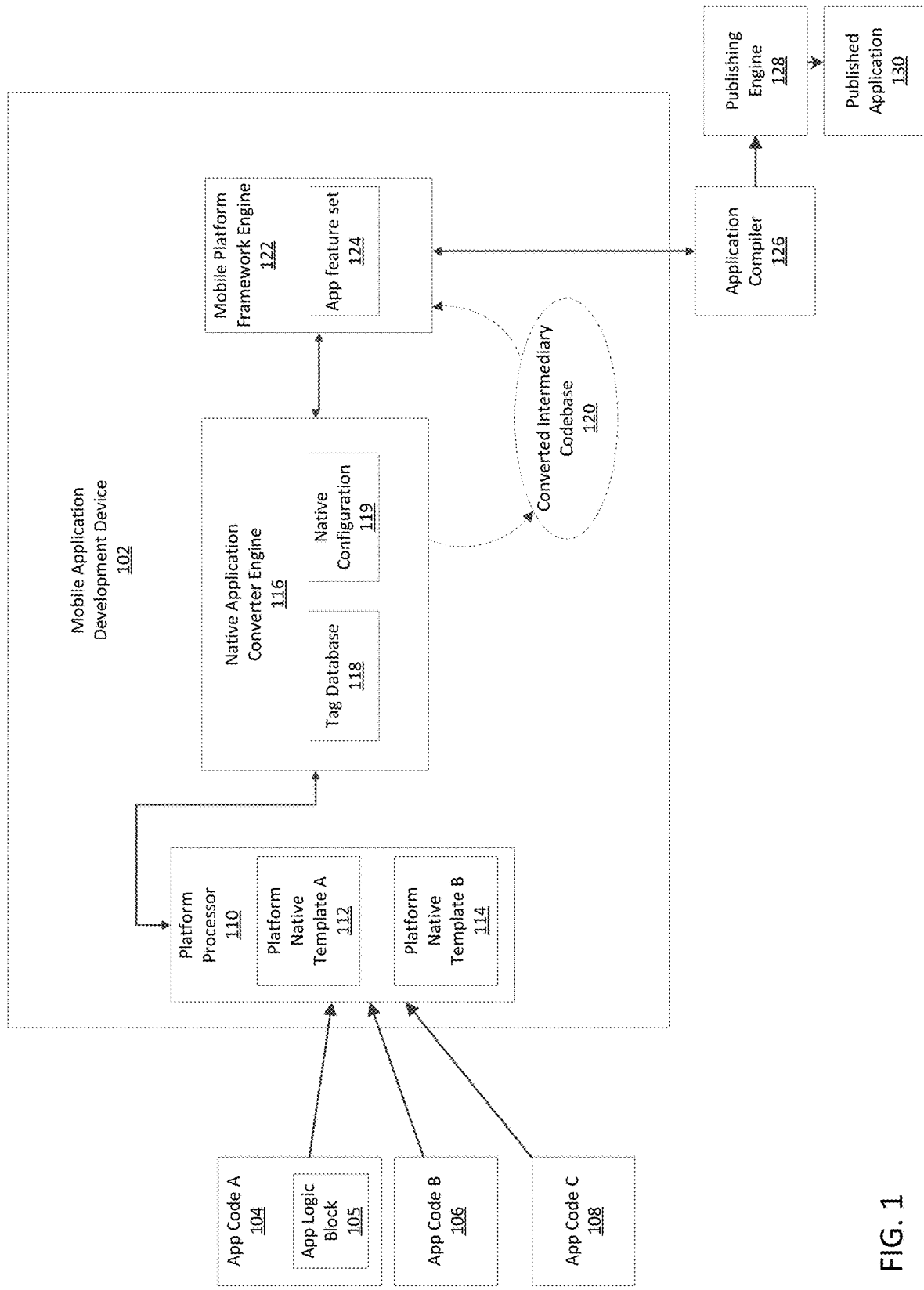
FIG. 1 schematically depicts a mobile application development device, according to one or more aspects described herein.

FIG. 1 schematically depicts a mobile application development device 102, according to one or more aspects described herein. It is contemplated that the mobile application development device 102 may be implemented as one or more hardware elements that include one or more application-specific integrated circuits. In other examples, the mobile application development device 102 may additionally or alternatively include software and/or firmware elements in order to implement the functionality described herein. Further examples of implementations of the mobile application development device 102 are presented in proceeding sections of this disclosure. It is further contemplated that the mobile application development device 102 may use any machine learning and/or deep learning processes that utilize supervised or unsupervised learning. As such, machine learning and deep learning may be used interchangeably in the description that follows.

The mobile application development device 102 may be utilized to facilitate efficient development of mobile applications suitable for execution on multiple different mobile operating systems. Advantageously, the mobile application development device 102 may allow for applications to be coded using one or more languages that are agnostic to the ultimate mobile operating system on which they will be run, such that developers can build functionality of an application that can be implemented on multiple different mobile operating systems. In one example, App Code A 104, App Code B 106, and App Code C 108 schematically represent blocks of code that define the functionality of three distinct applications. Elements 104-108 may alternatively be referred to as application build elements, blocks of code, or application builds, among others. App Code A 104, App Code B 106, and App Code C 108 may be coded using a general-purpose coding language that is not specific to any mobile operating system. Further, App Code A 104, App Code B 106, and App Code C 108 may use a same or different coding languages.

In one example, each of App Code A 104, App Code B 106, and App Code C 108 may be maintained/coded by a separate team within an organization, and each may represent a different mobile application with functionality that is intended to be run as a mobile application on different operating systems, and at different priority levels. For example, a given application may ultimately be implemented on two or more different mobile operating systems, and may be published as both an internal application and a public-facing application, whereby access permissions may differ between the internal and public facing application. Accordingly, the mobile application development device 102 may facilitate automated building of different versions of an application intended to be run on different mobile operating systems and as different build types (e.g. internal-facing and public-facing) from code that is written in a programming language that is agnostic to the operating system on which the application will ultimate may be run (e.g., from App Code A 104, App Code B 106, or App Code C 108). In one example, the App Code A 104, App Code B 106, and App Code C 108 blocks may be referred to as blocks of "business code," indicating that the functionality described by the App Code A 104, App Code B 106, and App Code C 108 blocks may concentrate on specific business functions, rather than details specific to a given mobile operating system or specific to communication and/or security elements.

In one example, one or more of the App Code A 104, App Code B 106, and App Code C 108 blocks may include an application logic block, or "app logic block 105." This app logic block 105 may include code describing one or more subcomponents of a broader/bigger application represented by App Code A 104, or another block of code. It is contemplated that the applications, and the subcomponents thereof represented by App Logic Block 105, may include any functionality, without departing from the scope of these disclosures. In certain examples, one or more of the App Code A 104 and the App Logic Block 105 may identify an application type that is to be built and published, including operating system on which the application is intended to be run, and/or a priority level associated with the application, which may indicate whether the application is to be an internal application, or a publicly available application.

In one example, the mobile application development device 102 may include a platform processor 110. The platform processor 110 may be configured to identify an application build element of an application and development, such as, in one example, App Code A 104, App Code B 106, and/or App Code C 108. The platform processor 110 may additionally be configured to identify and to classify an application logic block portion, such as App Logic Block 105. This classification may include identification of functionality associated with the application logic block, an intended mobile operating system on which the application is to be run, security features associated with/required as result of functionalities of the planned application, access permissions associated with the application to be built, user interface features associated with the application to be built, communication channels required by the application, among others.

In one example, the platform processor 110 may identify a platform on which an application associated with App Code A 104, App Code B 106, and/or App Code C 108 it is to be executed. This identification of a platform may include, among others, identifying elements within the code indicating a mobile operating system or other characteristics of the application to be built, such as a prioritization of the application as a high priority application build or a medium or low priority application build. The identification of a platform may also include an indicator of an application type in addition to a mobile operating system on which the application is intended to be executed. The application type information may include details on whether the application will be for internal customers within an organization, or whether the application will be available to external customers outside of the organization as a publicly available application. In one example, the platform processor 110 may receive information on the application type and platform on which the application is to be executed as separate information received from a user and separate to the App Code A 104, App Code B 106, and/or App Code C 108.

The platform processor 110 may be further configured to apply a platform-native template to an application logic block, such as block 105. This platform-native template may be specific to the platform on which the application is to be executed, such as a specific mobile operating system platform. Platform Native Template A 112 and Platform Native Template B 114 are two examples of templates that may be applied to App Logic Block 105 (or other blocks or whole application builds associated with App Code A 104, App Code B 106, and/or App Code C 108). Templates 112 and 114 may each be associated with a specific mobile operating system, and apply/convert elements of the coding of App Code A 104, App Code B 106, and/or App Code C 108 that are written in a platform-agnostic language to code that is suitable for building and publishing as an application for a specific mobile operating system. Accordingly, the platform processor 110 may facilitate hybrid development of a mobile application such that App Code A 104, App Code B 106, and/or App Code C 108 can be written/constructed by personnel in a desktop environment without requiring the testing of application functionality on a mobile device, and/or without specific knowledge of coding for a mobile device. Advantageously, mobile application development device 102 may allow the functionality, or "business code" of the App Code A 104, App Code B 106, and/or App Code C 108 to be separated from the specifics of implementing an application on a mobile device with adequate functionality specific to the mobile device, with robust security functionality, and with interconnectivity to other applications/databases/features of an organization within which the applications are being developed. The platform processor 110 may include one or more libraries of code elements associated with a platform on which the application is intended to run. For example, the platform processor 110 may include two separate libraries of code elements specific to each of the platforms associated with templates 112 and template 114.

The mobile application development device 102 may additionally include a native application converter engine 116. This native application converter engine 116 may be configured to execute one or more processes to identify logic features that are specific to an application to be built, and extract the logic features as a first set of tags associated with the application to be built. In one implementation, the identification of the logic features may include identification of features within an application logic block, such as block 105. In one example, this first set of tags may include application characteristics such as an application name, a unique identifier for the application, application icons, images, signatures, network security features, notification features, user interface features, among many others. The first set of tags may be extracted from App Code A 104, App Code B 106, and/or App Code C 108. In one example, the native application converter engine 116 may build native shells specific to a mobile operating system on which the application is to be run, and dynamically build these mobile operating system-specific shells dynamically during a build process based upon an application configuration. The extracted first set of tags may be stored within a tag database 118. It is contemplated that any database structure may be utilized for database 118 or any other database within this disclosure, without departing from the scope of these disclosures.

The native application converter engine 116 may additionally include one or more processes configured to identify a second set of tags within the template applied by the platform processor 110 (e.g., template 112 or 114). This second set of tags may correspond to/partially or wholly match the first set of tags identified within the application code associated with App Code A 104, App Code B 106, and/or App Code C 108.

In one example, the native application converter engine 116 may include a native configuration 119. This native configuration 119 may include elements that are to be inserted into one or more of the App Code A 104, App Code B 106, and/or App Code C 108 in order to prepare the application code for implementation on a specific mobile operating system. Accordingly, the native configuration 119 may be include features that are specific to a mobile operating system type, and/or application prioritization type (e.g., high, medium, or low priority application, internally facing or publically available application, among others). In one example, the native configuration 119 may include elements that are configured to replace the values associated with the second set of tags. The native application converter engine 116 may output a converted intermediary codebase 120 upon replacing the second set of tags with the values stored in the native configuration 119. This converted intermediary codebase 120 may then be communicated to a mobile platform framework engine 122.

In one example, the mobile platform framework engine 122 may be configured to add a common set of application features to the converted intermediary codebase 120. This common set of application features may include functional elements that are used in multiple or all applications built by an organization, such as user interface elements (navigation bars, artwork, logos, images, standard text such as disclaimers, among many others), network communication elements, notification features, security features (SSO, certificates, among others). In one example, the features applied by the mobile platform framework engine 122 may be stored in app feature set 124. It is contemplated that any storage structure may be utilized with element 124, without departing from the scope of these disclosures.

An application compiler 126 may be utilized to compile the code outputted from the mobile platform framework engine 122 once the common set of application features has been added to the converted intermediary codebase 120. This compiler 126 may be implemented as any suitable compiler element, device, and/or application, without departing from the scope of these disclosures. Further, a compiled application outputted from the application compiler 126 may be received by a publishing engine 128. The publishing engine 128 may be configured to publish the application on an internal, or external repository for applications such that the application may be accessed and downloaded to mobile devices as published application 150.

Figure 2:
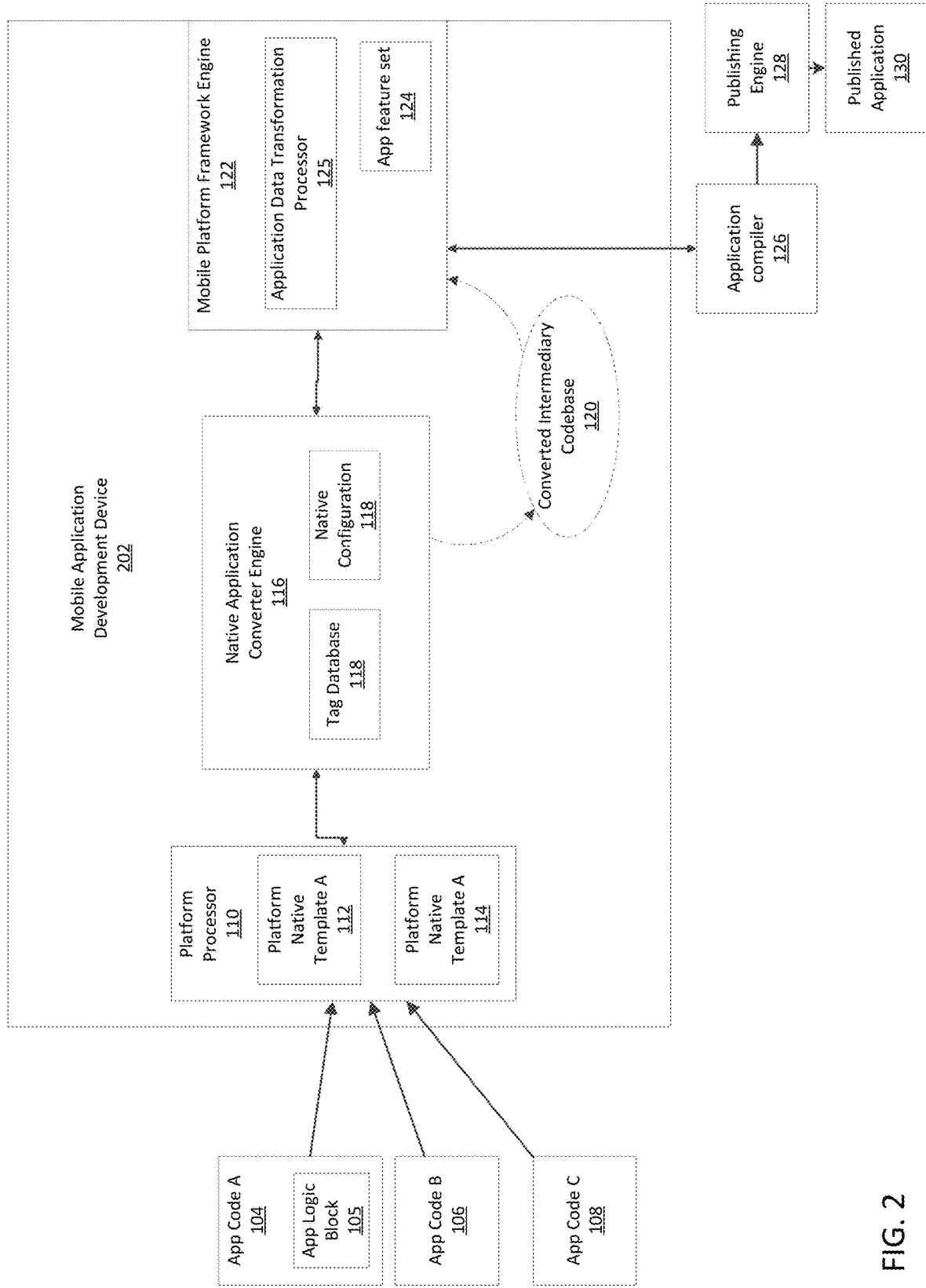
FIG. 2 schematically depicts another implementation of a mobile application development device, according to one or more aspects described herein.

FIG. 2 schematically depicts another implementation of a mobile application development device 202, according to one or more aspects described herein. In certain examples, the mobile application developer device 202 may otherwise be referred to as a two-phase application developer device 202, according to one or more aspects described herein. The two phases of mobile application development may be associated with a first phase implemented using a browser-based application development device/software, and a second phase implemented on a mobile device. The mobile application development device 202 may be similar to device 102, such that like elements are represented by the same numbers. In addition, the mobile application development device 202 includes an application data transformation processor 125. Advantageously, the application data transformation processor 125 is configured to facilitate two-phase development of cross-platform mobile applications. In one example, the first phase of the cross-platform mobile application development includes development of the business code associated with App Code A 104, App Code B 106, and/or App Code C 108 within a desktop environment using one or more programming languages that are agnostic to one or more specific languages and/or application features required by a mobile operating system on which an application is ultimately configured to be run. Alternatively, the first phase may be a web-based engine configured to emulate a mobile operating system. Further, the second phase of the cross-platform mobile application development may include finalization of the mobile application using a mobile simulator or directly on a mobile device. Advantageously, the application data transformation processor 125 facilitates this two-phase development by automatically implementing appropriate communication channels such that suitable communication can be established on the mobile application, and without requiring a developer building one or more of App Code A 104, App Code B 106, and/or App Code C 108 to be aware of the specifics of the required communication channels. In certain examples, the communication channels implemented by the application data transformation processor 125 may facilitate communication to one or more secure databases, applications, networks, browsers, mobile simulators or mobile devices, among other elements. It is contemplated that the application data transformation processor 125 may be configured to connect using any network communication protocol or channel (such as a virtual private network (VPN), among many others), and utilizing any suitable encryption or security protocol.

In one example, the application data transformation processor 125 may be configured to identify a communication request type, to select an appropriate network channel to fulfill the communication request, and to set up a communication session using an appropriate network channel to the requested destination. In one example, the communication session set up by the application data transformation processor 125 may be persistent or temporary, and may be obfuscated from a requester associated with the communication request type, such that the App Code A 104, App Code B 106, and/or App Code C 108 can be configured to retrieve data of differing types without specific knowledge of the data channels required to access the requested data. In one example, the application data transformation processor 125 may be configured to identify a source of a request as a desktop environment (it is contemplated that a desktop environment may refer to any application development efforts implemented on a non-mobile operating system, such that the hardware may include a desktop computer, a laptop computer, among others), a web browser, or a mobile device, and apply different communication strategies based on this identification. Accordingly, processor 125 may be configured to adapt as an application in development is migrated from being developed on a desktop/browser-based platform to being finalized or implemented on a mobile device. Accordingly, the application data transformation processor 125 may automatically update communication links within an application based upon the source of the request being a desktop environment, a web browser or a mobile device.

Figure 3:
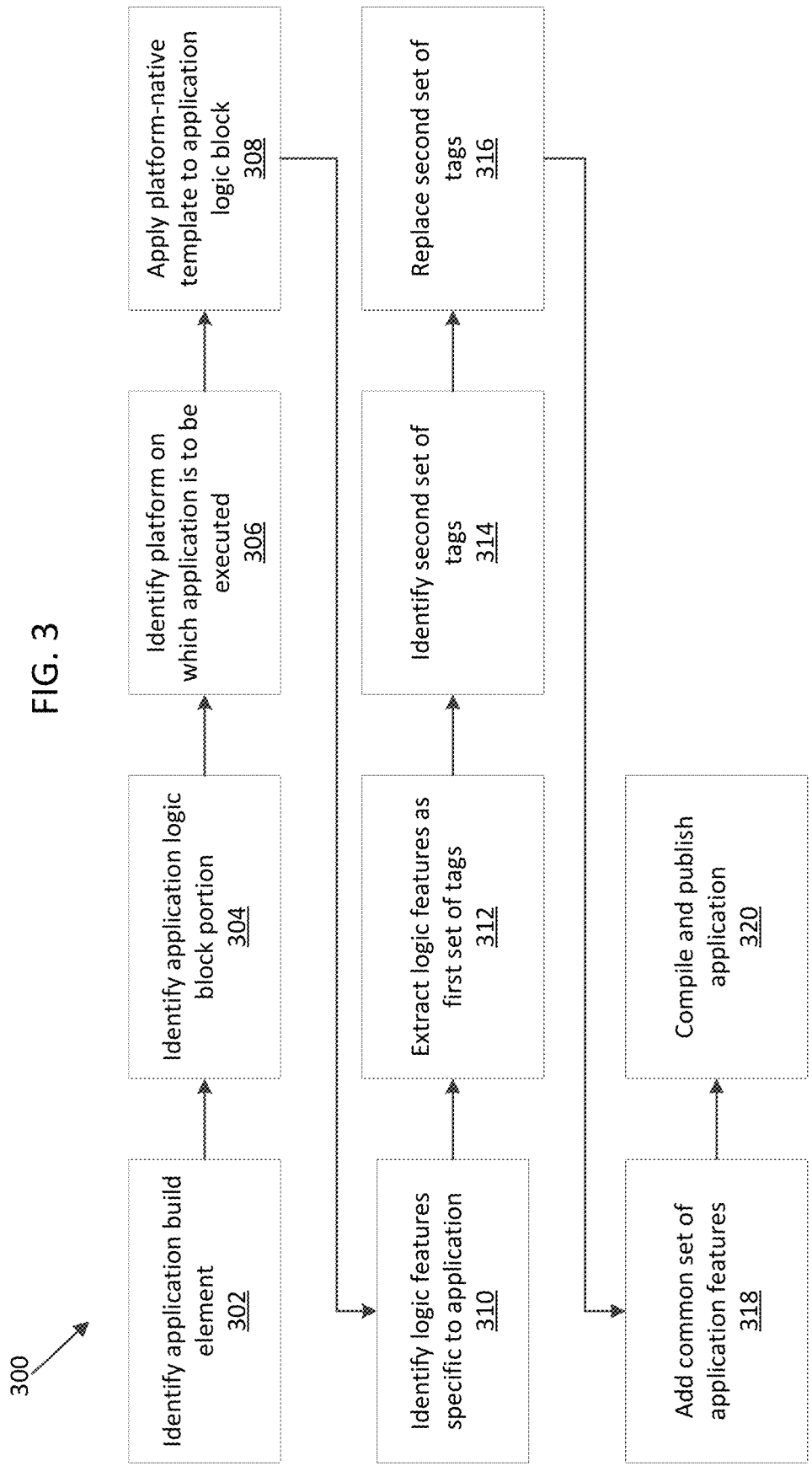
FIG. 3 is a flowchart diagram of a process for efficient development of a mobile application suitable for execution on multiple different mobile operating systems, according to one or more aspects described herein.

FIG. 3 is a flowchart diagram 300 of a process for efficient development of a mobile application suitable for execution on multiple different mobile operating systems. One or more processes may be executed at block 302 to identify an application build element, such as App Code A 104, App Code B 106, and/or App Code C 108. These one or more processes may be executed by the platform processor 110. Further, one or more processes may be executed at block 304 to identify an application logic block portion, such as logic block 105. This logic block portion may be written in a platform-agnostic programming language. It is contemplated that any programming languages may be utilized with the systems and methods described herein. In one example, the one or more processes executed at block 304 may be executed by the platform processor 110.

In one example, and at block 306, one or more processes may be executed to identify a platform on which an application is to be executed. These one or more processes may additionally identify an application type and/or priority type. Further, block 306 may be executed by the platform processor 110. At block 308, the platform processor 110 may execute one or more processes to apply a platform-native template to an application logic block.

One or more processes may be executed at block 310 to identify logic features that are specific to the application to be built. These logic features may be identified by the native application converter engine 116. Further, one or more processes may be executed to extract the logic features as a first set of tags associated with the application to be built at block 312, and executed by the native application converter engine 116. One or more processes may be executed at block 314 to identify a second set of tags within the template applied by the platform processor 110 that matches the first set of tags. Further, the second set of tags may be replaced with elements that are specific to the application to be built. This replacing may be executed by the native application converter engine 116, to result in a converted intermediary codebase 120.

Further, and at block 318, one or more processes may be executed to add a common set of application features. This addition of the common set of application features may be executed by the mobile platform framework engine 122. Subsequently, one or more processes may be executed to compile and publish the application at block 320, such that the compiling and publishing may be executed by the compiler 126 and publishing engine 128.

Figure 4:
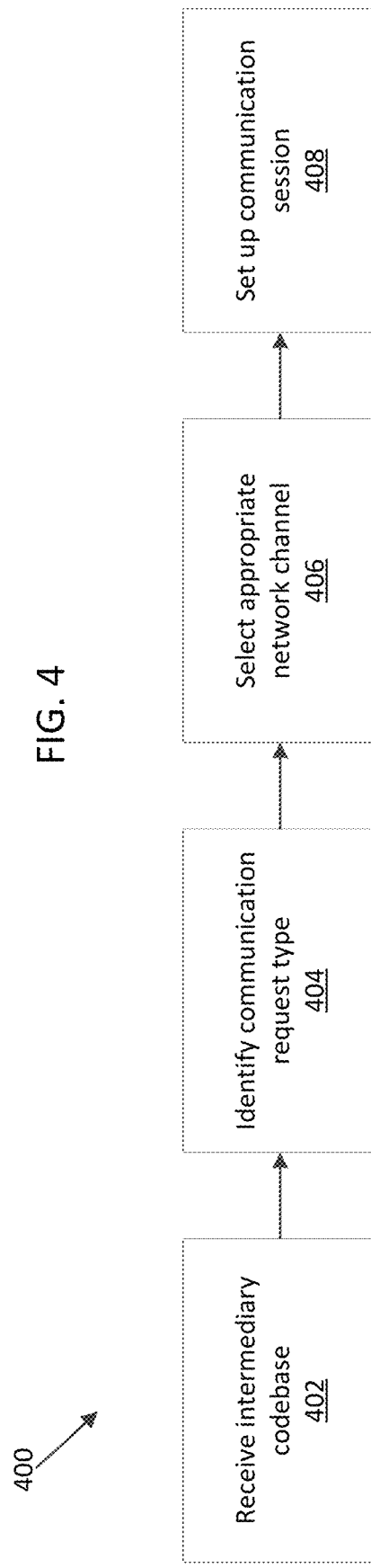
FIG. 4 schematically depicts a flowchart diagram of a process to facilitate two-phase development of cross-platform mobile applications using an application data transformation processor, according to one or more aspects described herein.

FIG. 4 schematically depicts a flowchart diagram 400 of a process to facilitate two-phase development of cross-platform mobile applications using an application data transformation processor, according to one or more aspects described herein. In one example, one or more processes may be executed at block 402 to receive the converted intermediary codebase 120. In one example, the converted intermediary codebase 120 may be received by the mobile application framework engine 122, and specifically by the application data transformation processor 125. One or more processes may be executed at block 404 to identify a communication request type from the received intermediary codebase 120. These one or more processes executed at block 404 may be executed by the application data transformation processor 125, and may include an identification of a request for information from a database, request for access to an internal or external network, a request for access to security certificates, a request for another application or a website or web-hosted application features, among many others.

The application data transformation processor 125 may be configured to select an appropriate network channel based upon one or more features of an application associated with App Code A 104, App Code B 106, and/or App Code C 108. For example, one or more processes may be executed at block 406 to select an appropriate network channel based upon identified connectivity requirements of an application to be built by the mobile application development device 202. The network channel selected at block 406 may be specific to the phase of development such that the application data transformation processor 125 may select a first network channel when the application is in an early stage of development (phase 1) and is being developed within a desktop/web environment, and may automatically select a second network channel when the application is in a later stage of development (phase 2) and being tested or implemented on a mobile device. Accordingly, the application data transformation processor 125 may provide for seamless communication continuity such that upstream development can request information from one or more sources without defining the specific communication channels that are to be used to obtain the requested information. In one example, the application data transformation processor 125 may utilize an internal network to facilitate communication between a requesting application and a source of the requested information (which may be a database, a website among others) when an application is being developed within a desktop/web-based development environment, and may utilize a virtual private network to facilitate the same information retrieval when the application is implemented on a mobile device. Accordingly, one or more processes may be executed by the application data transformation processor 125 at block 408 to set up a communication session to facilitate the requested data type on the selected network channel.

Figure 5:
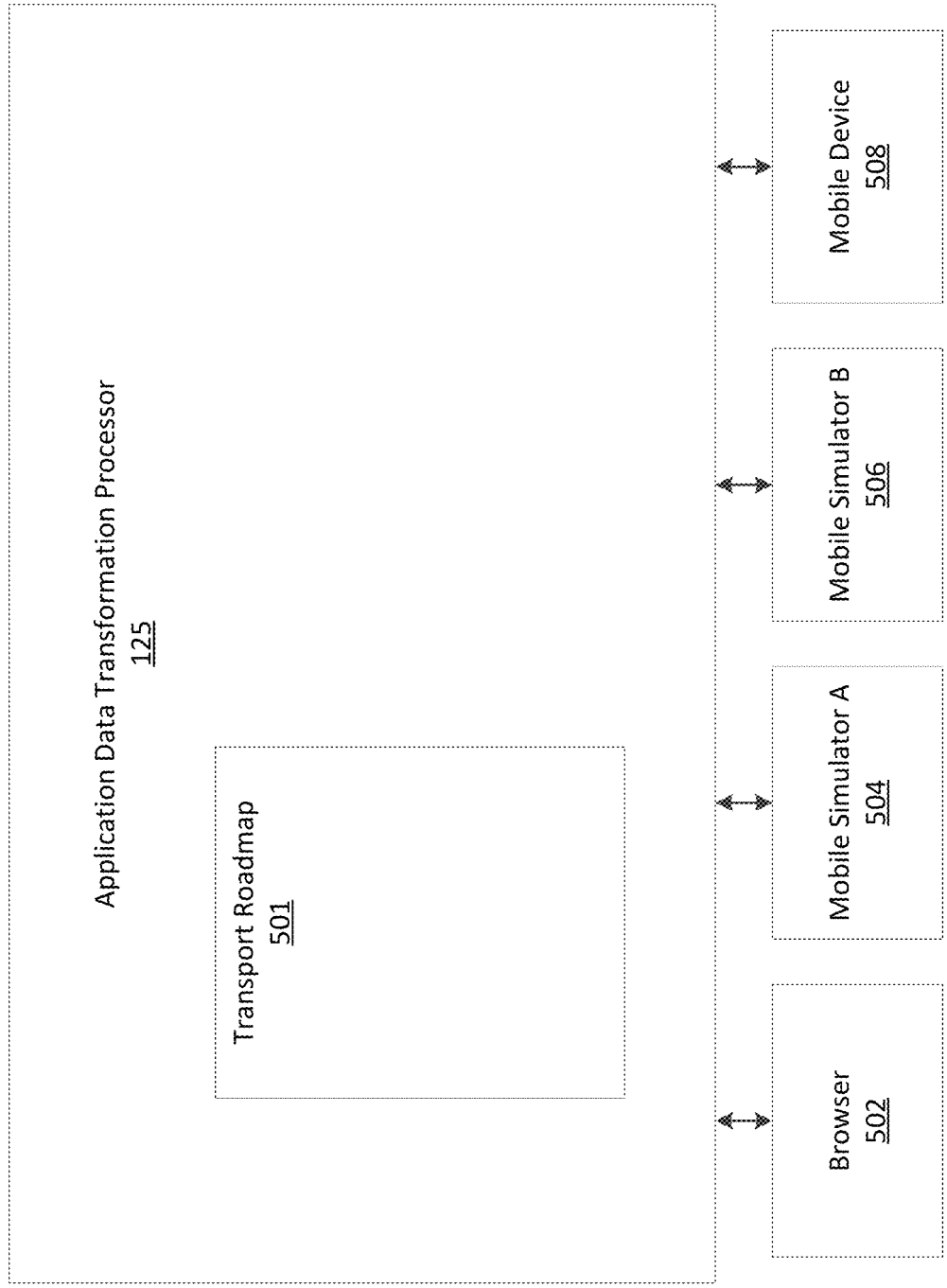
FIG. 5 schematically depicts the application data transformation processor, according to one or more aspects described herein.

FIG. 5 schematically depicts the application data transformation processor 125. In one example, the application data transformation processor 125 includes a transport roadmap 501. This transport roadmap 501 may include a database of communication channel types associated with different request sources and destinations for example, the roadmap 501 may include a store of primary, secondary, and tertiary communication channels sorted based upon the type of information requested, the type of requester (e.g. a request from an application in phase 1 of development on a desktop/web-based platform, or in phase 2 of development on a mobile device, among others), a destination address/source. The communication channels may include different communication protocols, different hardware types, and different communication methodologies. In certain examples, the transport roadmap 501 may include multiple nodes in a communication path, and may include details for setting up secure communication channels, using virtual private networks (VPNs) or other tunneling methodologies, among others. It is contemplated that the application data transformation processor 125 may be configured to utilize any communication hardware, firmware, and/or software type, without departing from the scope of these disclosures. Further, the application data transformation processor 125 may be configured to connect to different data sources, which may include a web browser 502, applications configured to simulate different mobile operating systems, such as Mobile Simulator A 504

In certain examples, the mobile application development device 102 and/or 202 may implement machine learning processes in order to implement any of the features described herein, such as any of the features described as having automated processes. In certain examples, a framework for machine learning implemented by the device 102 and/or 202 may involve a combination of one or more components, which may include three components: (1) representation, (2) evaluation, and (3) optimization components. Representation components refer to computing units that perform steps to represent knowledge in different ways, including but not limited to: as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks (e.g., the human brain). Such structures, while significantly more complex than conventional computer systems, are beneficial in implementing machine learning. For example, an artificial neural network may be comprised of a large set of nodes which, like neurons in the brain, may be dynamically configured to effectuate learning and decision-making. Moreover, machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

In an embodiment involving supervised machine learning, a graph module corresponding to an artificial neural network may receive and execute instructions to modify the computational graph. A supervised machine learning model may provide an indication to the graph module that output from the machine learning model was correct and/or incorrect. In response to that indication, the graph module may modify one or more nodes and/or edges to improve output. The modifications to the nodes and/or edges may be based on a prediction, by the machine learning model and/or the graph module, of a change that may result an improvement. The modifications to the nodes and/or edges may be based on historical changes to the nodes and/or edges, such that a change may not be continuously made and unmade (an undesirable trend which may be referred to as oscillation). Feedback may be additionally or alternatively received from an external source, such as an administrator, another computing device, or the like. Where feedback on output is received and used to reconfigure nodes and/or edges, the machine learning model may be referred to as a supervised machine learning model.

In supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of one hundred photos with labeled human faces and ten thousand random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct").

In one example, a machine learning engine may identify relationships between nodes that previously may have gone unrecognized, for example, using collaborative filtering techniques. This realization by the machine learning engine may increase the weight of a specific node; and subsequently spread weight to connected nodes. This may result in particular nodes exceeding a threshold confidence to push those nodes to an updated outcome from a Boolean false to a Boolean true. Other examples of machine learning techniques may be used in combination or in lieu of a collaborative filtering technique.

In addition, one theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components may be manually tuned by to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals clearer, given the nearly infinite number of variables that can possible be optimized in the machine learning system. A framework for machine learning may involve a combination of supervised and unsupervised learning models.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed herein may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

The various elements described throughout this disclosure may be implemented as standalone hardware elements, or as a combination of hardware, firmware, and software components. For example, each of the elements of FIG. 1 may be implemented as standalone hardware elements embodied as application-specific integrated circuits or similar hardware elements. In another example, two or more of the elements of FIG. 1 may be combined together and implemented as dedicated hardware elements. In yet another example, one or more elements of FIG. 1 may be implemented as firmware and/or software modules. Further, one or more of the elements of FIG. 1 may be embodied using a general-purpose or specialized computing system, such as computing system 600 from FIG. 6.

Figure 6:
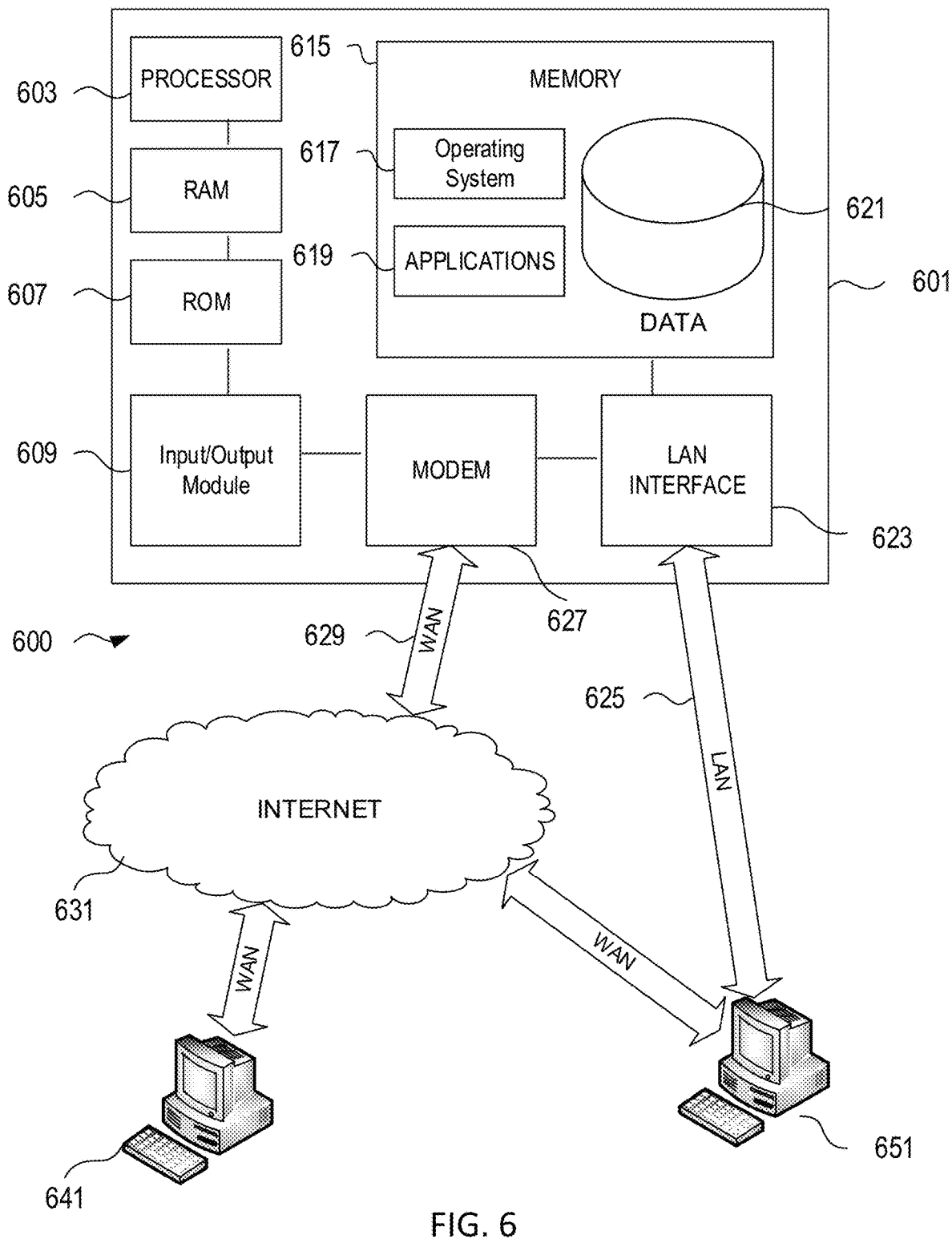
FIG. 6 shows an illustrative operating environment in which various aspects of the disclosure may be implemented, according to one or more aspects described herein.

As such, the mobile application development device 102, or one or more of the modules of the device 102 may be implemented as one or more network-linked computer devices, such as device 601 from FIG. 6. Thus, the mobile application development device 102 may be implemented on consolidated computing hardware, such as computing device 601, at a single geographic location, and/or on a single integrated circuit, and the like. In another example, the mobile application development device 102 may be implemented across multiple computing devices at a common, or dispersed geographic locations. In one example, the device 601 may be in communication with devices 641 and 651 using one or more networking technologies (625, 629, and/or 631) described in further detail in the description that follows.

In one example implementation, computing device 601 may have a processor 603 for controlling overall operation of device 601 and its associated components, including RAM 605, ROM 607, an input/output (I/O) module 609, and memory 615. In one example, as will be apparent to those of ordinary skill in the art, memory 615 may comprise any known form of persistent and/or volatile memory, such as, among others, a hard disk drive, a solid state disk, optical disk technologies (CD-ROM, DVD, Blu-ray, and the like), tape-based stored devices, ROM, and RAM, or combinations thereof. In this way, memory 615 may comprise a non-transitory computer-readable medium that may communicate instructions to processor 603 to be executed.

I/O module 609 may include a microphone, keypad, touch screen, and/or stylus through which a user of the computing device 601 may provide input, and may also include one or more of a speaker for providing audio output and a video display device for providing textual, audiovisual and/or graphical output. Software may be stored within memory 615 and/or storage to provide instructions to the processor 603 for allowing the computing device 601 to perform various functions. For example, memory 615 may store software used by the computing device 601, such as an operating system 617, application programs 619, and an associated database 621. The processor 603 and its associated components may allow the computing device 601 to run a series of computer-readable instructions to process and format data.

The computing device 601 may operate in a networked environment supporting connections to one or more remote computers, such as computing devices 641 and 651. In one example, the computing devices 641 and 651 may be personal computers or servers that include many, or all, of the elements described above relative to the computing device 601. Specifically, the computing device 641 may represent one or more elements of the remote environment 120 and computing device 651 may represent one or more elements of the destination environment 140. Alternatively, computing device 641 and/or 651 may be a data store that is affected by the operation of the computing device 601. The network connections depicted in FIG. 6 include a local area network (LAN) 625 and a wide area network (WAN) 629, but may also include other networks. When used in a LAN networking environment, the computing device 601 is connected to the LAN 625 through a network interface or adapter 623. When used in a WAN networking environment, the computing device 601 may include a modem 627 or other means for establishing communications over the WAN 629, such as the Internet 631. It will be appreciated that the network connections shown are illustrative and other means of establishing a communications link between the computers may be used. In one implementation, the various elements described in relation to the protocol-agnostic file transfer apparatus 102 may be configured to accept inbound networking communications and/or transfer outbound networking communications to one or more networking protocols. These networking protocols may include any of various well-known protocols such as TCP/IP, Ethernet, File Transfer Protocol (FTP), Hypertext Transfer Protocol (HTTP), FTP over SSL (FTPS), HTTP over SSL (HTTPS), SSH File Transfer Protocol (SFTP), Secure Copy (SCP), Web Distributed Authoring and Versioning (WebDAV), Secure Web Distributed Authoring and Versioning (WebDAVS), Trivial File Transfer Protocol (TFTP), Applicability Statement 2 (AS2), Odette File Transfer Protocol (OFTP), and Accelerated File Transfer Protocol (AFTP). Communication between one or more of computing devices 601, 641, and/or 651 may be wired or wireless, and may utilize Wi-Fi, a cellular network, Bluetooth, infrared communication, or an Ethernet cable, among many others.

An application program 619 used by the computing device 601 according to an illustrative embodiment of the disclosure may include computer-executable instructions for invoking functionality related to the machine learning training device 102. The computing device 601 and/or the other devices 641 or 651 may also be mobile devices, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

The present disclosures provide technical advantages. In one implementation, the mobile application development device 102 is configured to facilitate automated mobile application development that utilizes reduced computational resources and reduces development time and complexity by implementing a device that can receive application code such as from App Code A 104, App Code B 106, and/or App Code C 108, and apply elements that are specific to one or more mobile operating systems on which the applications are intended to execute. Accordingly, the mobile application developer device 102 negates the need for personal developing one or more of the App Code A 104, App Code B 106, and/or App Code C 108 to be aware of the specific details of development for one or more mobile operating systems and/or associated elements, such as security protocols, approved communication channels and the like. In certain instances, the mobile application development device 102 may utilize machine learning operations to facilitate automated processing. Accordingly, the mobile application development device 102 may be configured to process high volumes of information and execute complex comparison algorithms and evaluations of different combinations code elements.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the computer arts will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

In one aspect, this disclosure includes a mobile application development device that includes a platform processor. The platform processor may be configured to identify an application build element of an application in development, identify and classify an application logic block portion of the application build element written in a platform-agnostic language, and identify a platform on which application is to be executed. The platform processor may further be configured to apply a platform-native template to the application logic block that is specific to the platform on which application is to be executed. The mobile application development device may further include a native application converter engine that is configured to identify logic features that are specific to the application to be built, and to extract the logic features as a first set of tags associated with the application to be built. The native application converter engine may also be configured to identify a second set of tags within the template applied by the platform processor, such that the second set of tags matches the first set of tags. The native application converter engine may further be configured to replace the second set of tags with elements that are specific to the application to be built, and to provide a converted intermediary codebase. The mobile application development device may also include a mobile platform framework engine that is configured to add a common set of application features to the converted intermediary codebase, such that subsequent to the addition of the common set of application features, the converted intermediary codebase is compiled and outputted as the application.

The platform processor of the mobile application developer device may additionally include a library of code elements associated with the platform on which the application is intended to run.

The platform on which the application is intended to run may be a specific mobile operating system.

In one example, the identification of the logic features includes identification of features within the application logic block.

In another example, the first set of tags identified security elements and images.

The concept of application features includes one or more of a network security feature, notification feature and a user interface feature.

The mobile application development device may also include an application compiler configured to compile and/or publish the application from the converted intermediary codebase.

In another example, the outputted application may be published using a publishing engine.

A mobile application development device may include a processor, and a non-transitory computer-readable medium comprising computer-executable instructions that, when executed by the processor, are configured to identify an application build element of an application in development, and identifying classify an application logic block portion of the application build element written in a platform-agnostic language. The computer-executable instructions may further be configured to identify a platform on which the application is to be executed, apply a platform-native template to the application logic block that is specific to the platform on which the application is to be executed, identify logic features that are specific to the application to be built, and extract the logic features as a first set of tags associated with the application to be built. The computer-executable instructions may further include identification of a second set of tags within the applied platform-native template that matches the first set of tags, replacing the second set of tags of elements that are specific to the application to be built to produce a converted intermediary codebase, and adding a common set of application features to the converted intermediary codebase. In one example, subsequent to the addition of the common set of application features, the converted intermediary codebase maybe compiled and outputted as the application.

The platform associated with mobile application development device may be a specific mobile operating system.

The identification of the Lodge features may include identification of features within the application logic block.

In one example, the first set of tags identify security elements and images.

In another example, the common set of application features include a network security feature, and notification feature, and a user interface feature.

The mobile application development device may additionally include an application compiler configured to compile and/or publish the application from the converted intermediary codebase.

The outputted application may be published using a publishing engine.

A method for mobile application development may include identifying an application build element of an application in development, identifying and classifying application logic block portion of the application build element written in a platform-agnostic language, identifying a platform on which application is to be executed, applying a platform-native template of the application logic block that is specific to the platform on which the application is to be executed, identifying logic features that are specific to the application to be built, and extracting the logic features is a first set of tags associated with the application to be billed. The method may additionally include identifying a second set of tags within the applied platform-native template that matches the first set of tags, replacing the second set of tags with elements that are specific to the application to be billed to produce a converted intermediary codebase, and adding a common set of application features to the converted intermediary codebase, such that subsequent to the addition of the common set of application features, the converted intermediary codebase is compiled and outputted as the application.

In another aspect, a mobile application development device includes a platform processor. The platform processor may be configured to identify an application build element of an application in development, identify and classify an application logic block portion of the application build element written in a platform-agnostic language, and identify a platform on which application is to be executed. The platform processor may further be configured to apply a platform-native template to the application logic block that is specific to the platform on which application is to be executed. The mobile application developer device may further include a native application converter engine that is configured to identify logic features that are specific to the application to be built to extract the logic features as a first set of tags associated with the application to be built. The native application converter engine may also be configured to identify a second set of tags within the template applied by the platform processor, such that the second set of tags matches the first set of tags. The native application converter engine may further be configured to replace the second set of tags with elements that are specific to the application to be built, to provide a converted intermediary codebase. The mobile application development device may also include a mobile platform framework engine that is configured to add a common set of application features to the converted intermediary codebase. The mobile platform framework engine may further include an application data transformation processor that is configured to identify a communication request type, select an appropriate network channel to fulfill the communication request, and set up a communication session using the appropriate network channel to a requested destination.

The communication session may be obfuscated from a requester associated with the communication request type.

The communication request type may identify a source of the request as a web browser or a mobile device.

The platform processor of the mobile application developer device may additionally include a library of code elements associated with the platform on which the application is intended to run.

The platform on which the application is intended to run may be a specific mobile operating system.

In one example, the identification of the logic features includes identification of features within the application logic block.

In another example, the first set of tags identified security elements and images.

The concept of application features includes one or more of a network security feature, notification feature and a user interface feature.

The mobile application development device may also include an application compiler configured to compile and/or publish the application from the converted intermediary codebase.

In another example, the outputted application may be published using a publishing engine.

Accordingly, it will be understood that the invention is not to be limited to the embodiments disclosed herein, but is to be understood from the following claims, which are to be interpreted as broadly as allowed under the law.

The invention claimed is:

1. One or more non-transitory computer-readable media storing instructions that, when executed by a computing platform comprising at least one processor and memory, cause the computing platform to:
   classifying, for an application, an application logic block of an application build element written in a platform-agnostic language;
   applying a platform-native template to the application logic block that is specific to a platform on which the application is to be executed;
   extracting at least one logic feature as a first set of tags associated with the application to be built;
   matching a second set of tags within the applied platform-native template with the first set of tags; and
   replacing the second set of tags with elements that are specific to the application to be built to produce a converted intermediary codebase.

2. The one or more non-transitory computer-readable media of claim 1 wherein the platform is a specific mobile operating system.

3. The one or more non-transitory computer-readable media of claim 1 wherein the at least one logic feature comprises a feature within the application logic block.

4. The one or more non-transitory computer-readable media of claim 1 wherein the first set of tags identify security elements and images.

5. The one or more non-transitory computer-readable media of claim 1, wherein the instructions further cause the computing platform to:
compile the application from the converted intermediary codebase.

6. A mobile application development device, comprising:
a platform processor, configured to:
classify, for an application, an application logic block of an application build element written in a platform-agnostic language; and
apply a platform-native template to the application logic block that is specific to a platform on which the application is to be executed; and
a native application converter engine, configured to:
extract at least one logic feature as a first set of tags associated with the application to be built;
match a second set of tags within the template applied by the platform processor with the first set of tags; and
replace the second set of tags with elements that are specific to the application to be built to produce a converted intermediary codebase.

7. The mobile application development device of claim 6, further comprising an application compiler configured to compile the application from the converted intermediary codebase.

8. The mobile application development device of claim 7, wherein the compiled application is published using a publishing engine.

9. The mobile application development device of claim 8, wherein the publishing engine deposits the application on a repository for subsequent accessing and downloading by a mobile device.

10. The mobile application development device of claim 6, wherein the platform processor comprises a library of code elements associated with the platform on which the application is intended to run.

11. The mobile application development device of claim 6, wherein the platform is a specific mobile operating system.

12. The mobile application development device of claim 6, wherein the at least one logic feature comprises a feature within the application logic block.

13. The mobile application development device of claim 6, wherein the first set of tags identify security elements and images.

14. A method for mobile application development, comprising:
classifying, for an application, an application logic block of the application build element written in a platform-agnostic language;
applying a platform-native template to the application logic block that is specific to a platform on which the application is to be executed;
extract at least one logic feature as a first set of tags associated with the application to be built;
matching a second set of tags within the applied platform-native template with the first set of tags; and
replacing the second set of tags with elements that are specific to the application to be built to produce a converted intermediary codebase.

15. The method of claim 14, further comprising:
compiling the converted intermediary codebase.

16. The method of claim 15, further comprising:
outputting the compiled converted intermediary codebase as the application.

17. The method of claim 14, wherein the platform is a specific mobile operating system.

18. The method of claim 14, wherein the at least one logic feature comprises a feature within the application logic block.

19. The method of claim 14, wherein the first set of tags identify security elements and images.

20. The method of claim 14, further comprising:
including a library of code elements associated with the platform on which the application is intended to run.

* * * * *